United States Patent
Goss et al.

(10) Patent No.: US 9,904,354 B2
(45) Date of Patent: Feb. 27, 2018

(54) OPERATING DEVICE FOR A HOUSEHOLD APPLIANCE HAVING AN ELECTRONIC DISPLAY PANEL

(75) Inventors: Ulrich Goss, München (DE); Oliver Kraemer, München (DE); Robert Sachon, München (DE)

(73) Assignee: BSH Hausgeräte GmbH, Munich (DE)

( * ) Notice: Subject to any disclaimer, the term of this patent is extended or adjusted under 35 U.S.C. 154(b) by 471 days.

(21) Appl. No.: 13/990,157

(22) PCT Filed: Dec. 12, 2011

(86) PCT No.: PCT/EP2011/072412
§ 371 (c)(1),
(2), (4) Date: May 29, 2013

(87) PCT Pub. No.: WO2012/080154
PCT Pub. Date: Jun. 21, 2012

(65) Prior Publication Data
US 2013/0249847 A1    Sep. 26, 2013

(30) Foreign Application Priority Data

Dec. 16, 2010 (DE) .................. 10 2010 063 186

(51) Int. Cl.
| | |
|---|---|
| G06F 3/01 | (2006.01) |
| G06F 3/02 | (2006.01) |
| G06F 3/041 | (2006.01) |
| F24C 7/08 | (2006.01) |
| F24C 15/00 | (2006.01) |

(52) U.S. Cl.
CPC ............... *G06F 3/01* (2013.01); *F24C 7/082* (2013.01); *F24C 15/00* (2013.01); *G06F 3/02* (2013.01); *G06F 3/041* (2013.01)

(58) Field of Classification Search
USPC .... 345/156, 173, 184; 200/4, 336, 564, 572, 200/316
See application file for complete search history.

(56) References Cited

U.S. PATENT DOCUMENTS 5,936,613 A * 8/1999 Jaeger ................... G06F 3/0238
                                                                        345/172
6,097,016 A * 8/2000 Hirata et al. ................... 219/720
(Continued)

FOREIGN PATENT DOCUMENTS

DE     102006022326 A1    11/2007
DE     102006026187 A1    12/2007
(Continued)

OTHER PUBLICATIONS

International Search Report PCT/EP2011/072412 dated Apr. 24, 2012.

*Primary Examiner* — Jennifer Mehmood
*Assistant Examiner* — Deeprose Subedi
(74) *Attorney, Agent, or Firm* — Michael E. Tschupp; Andre Pallapies; Brandon G. Braun

(57) ABSTRACT

An operating device for a household appliance includes an electronic display panel, and an operating element that is displaceable relative to the display panel to set operating conditions of the household appliance. The operating element has a region which is disposed within an area of the display panel.

32 Claims, 1 Drawing Sheet

(56) References Cited

U.S. PATENT DOCUMENTS

| | | | |
|---|---|---|---|
| 7,340,333 B2 * | 3/2008 | Lenneman | B60K 35/00 700/17 |
| 7,489,303 B1 * | 2/2009 | Pryor | B60K 35/00 345/173 |
| RE40,891 E * | 9/2009 | Yasutake | 345/173 |
| 2006/0047344 A1 * | 3/2006 | Head | F24C 7/082 700/1 |
| 2006/0163045 A1 * | 7/2006 | Kikuya | B60H 1/0065 200/56 R |
| 2007/0069914 A1 * | 3/2007 | Lenneman | B60K 35/00 340/691.6 |
| 2007/0095634 A1 * | 5/2007 | Misuda | G01D 5/252 200/11 R |
| 2007/0156290 A1 * | 7/2007 | Froman et al. | 700/284 |
| 2008/0109312 A1 * | 5/2008 | Ebrom et al. | 705/14 |
| 2008/0126073 A1 * | 5/2008 | Longe | G06F 3/0236 704/1 |
| 2009/0006970 A1 * | 1/2009 | Jeffery et al. | 715/733 |
| 2009/0009491 A1 * | 1/2009 | Grivna | G06F 3/033 345/184 |
| 2009/0217712 A1 * | 9/2009 | Kim | D06F 39/005 68/12.27 |
| 2009/0267921 A1 * | 10/2009 | Pryor | B60K 35/00 345/177 |
| 2010/0214213 A1 * | 8/2010 | Bowden | B60K 35/00 345/157 |
| 2011/0181523 A1 * | 7/2011 | Grothe et al. | 345/173 |
| 2012/0084728 A1 * | 4/2012 | Huang | G06F 3/0488 715/810 |

FOREIGN PATENT DOCUMENTS

| | | | | |
|---|---|---|---|---|
| EP | 0844325 A2 * | 5/1998 | | D06F 39/005 |
| EP | 0867792 B1 | 2/2003 | | |
| EP | 0844325 B1 | 4/2003 | | |
| EP | 2211115 A2 | 7/2010 | | |
| WO | WO2010/031125 | * | 3/2010 | 715/810 |

* cited by examiner

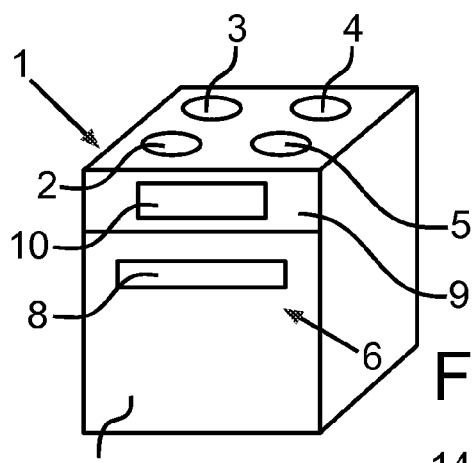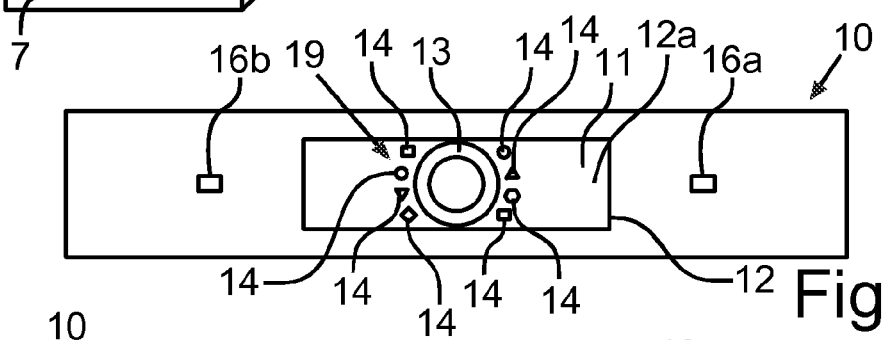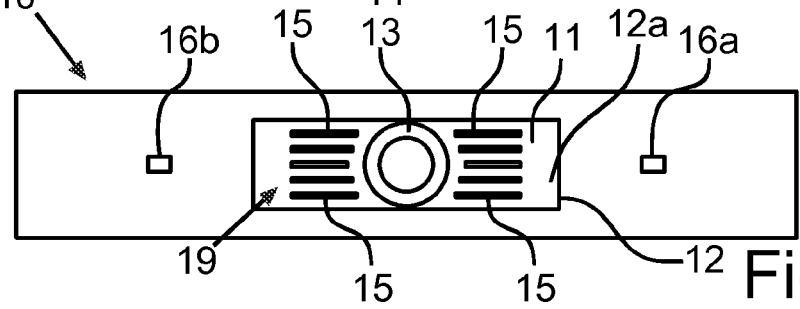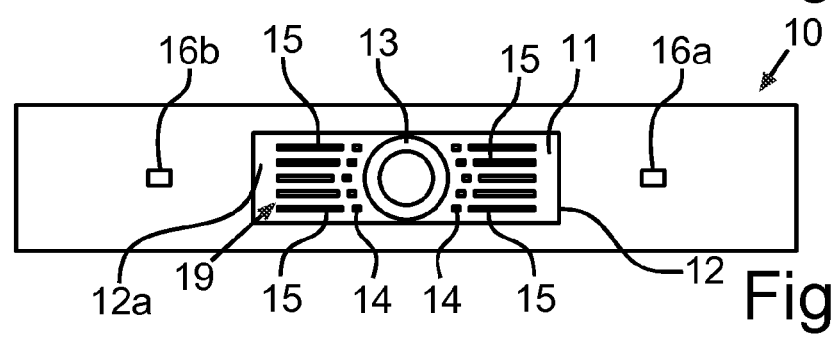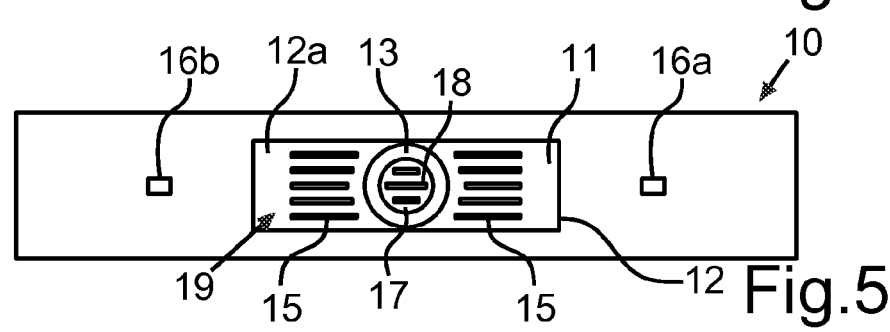

OPERATING DEVICE FOR A HOUSEHOLD APPLIANCE HAVING AN ELECTRONIC DISPLAY PANEL

BACKGROUND OF THE INVENTION

The invention relates to an operating device for a household appliance, having an electronic display panel and an operating element that can be displaced relative to the display panel for setting operating conditions of the household appliance.

There are known operating devices for household appliances which have digital display panels in which text and/or letters are displayed. Such displays usually exist as standalone components in an operating device. Operating elements which are designed as rotary selector switches or pushbuttons or toggle switches, for example, can be provided as units which are separate from or adjacent to said stand-alone components. Touch-sensitive operating panels such as those realized for example as touch screens and the like are also known.

BRIEF SUMMARY OF THE INVENTION

The object of the present invention is to create an operating device which guarantees the mechanically stable embodiment and operational capability of a manually displaceable operating element with, furthermore, the operating device being intended to be compact and minimized in relation to the surface area and, furthermore, the presentation of the information on the electronic display panel being intended to be easily visible when the operating element is operated.

An inventive operating device for a household appliance includes an electronic display panel and an operating element which can be displaced relative to the display panel for setting the operating conditions of the household appliance. The operating element is disposed, at least in some regions, within the display panel. This means that, with respect to the dimensions of the electronic display panel, the operating element is positioned with its front dimensions projecting, at least in some regions, into the surface of the display panel. An electronic display panel is understood to be in particular a display on which information which changes dynamically can be displayed. This can be information containing letters and/or numbers and/or symbols.

With respect to its arrangement and spatial positioning, the operating element is therefore embedded, at least in some regions, in the surface of the display panel.

Regarding this, provision is preferably made for the operating element to be disposed completely within the surface dimensions of the display panel.

The at least partial disposition of the operating element within the surface dimensions of the display panel is in particular also understood to be the embodiment below, in which the contour of the edge of the operating element in the area in which it faces the display panel is matched to the contour and shape of the surface edge of the display panel and these contour shapes more or less adjoin each other.

The operating element can also be disposed, at least in some regions, directly in front of the display panel and can then partially conceal the display panel.

A very compact operating device that is minimized in terms of area can therefore be created by such an embodiment. Previously in this regard it was not possible to combine electronic display panels with such types of manually displaceable operating elements and install them together exactly with regard to the aforementioned specific arrangement and positioning. In addition to a compact embodiment of the operating element, the operating element can therefore be moved relative to the display panel in a particularly advantageous manner and the information then produced on the display panel is displayed immediately next to the operating element. As a result, a user can be made aware of this information in an intuitively simple and reliable manner. When the user operates the operating element his line of sight is automatically directed toward the operating element and, due to its positioning with respect to the electronic display panel, the information which is also displayed in the immediate vicinity of the operating element can be seen immediately and automatically.

The operating element is preferably embodied as a rotary selector switch. This means that the relative mobility of the operating element with respect to the display panel is developed by a rotary motion of the operating element. This specification of the operating element can be combined with the electronic display panel in a particularly advantageous manner. Especially in view of the method of operation and the information then to be displayed on the electronic display panel around the operating element, this makes it possible for the smallest possible area of the display to be covered by the user or his hand, respectively, when the operating element is operated.

Provision can also be made for the operating element to be a touch-sensitive operating element which, by touching and dragging on the touch-sensitive area, results in setting an operation of the household appliance. However, no such types of operating elements exist which can be moved relative to the display panel.

Provision is preferably made for it to be possible to change the information to be displayed in at least one area of the display panel, as a function of the movement of the operating element. The dynamic of the information presentation can therefore be varied by the operating element itself. This is a significant functionality.

Provision is preferably made for it to be possible for a menu interface to be displayed to be displayed on the display panel around the operating element. The menu interface can contain higher-level information folders which can be selected by rotating the operating element and the information contained in said folders then displayed in detail by further operation of the operating element or of other components. Basically, however, the menu interface can also contain the associated end information and cannot therefore display any folder structure.

The menu interface is preferably dynamically changeable. Even this can be realized by the operating element. As a result, the possibilities for expanding the presentation of information on the display panel are manifold and, due to the embodiment of the menu interface and the dynamic changeability, can be made very user-friendly and easy to understand.

Menu contents can preferably be activated as a function of the position, in particular the rotary position, of the operating element.

The activation of the contents of a menu preferably includes illumination of menu contents in a luminous color which differs from that of non-activated menu contents. Instead of this, however, activation can also include a change in the font size and/or a change in the number size and/or a change in the symbol size of the displayed information. Here too the selection can therefore be signaled in a simple and rapid manner to bring it to the user's notice.

Provision is preferably made for one front face of the operating element to be embodied, at least in some regions, as an area of the display panel. Consequently, the operating element arranged in the display panel can itself contribute to the enlargement of the display panel. Especially when the operating element is embodied as a rotary selector switch and this is not embodied as a full circular disk but only as a ring, for example, the area enclosed by the ring can be used to display information. In particular, this area can also be an electronic display panel.

Provision is made in particular for a front face of the operating element to be embodied, at least in some regions, as an electronic display area on which information can be displayed.

Provision is preferably made for an area enclosed by the operating element to have a touch-sensitive control panel with which operating conditions of the household appliance can be set by touch. In particular, if the operating element is a ring, the circular area inside the ring can be embodied as a touch-sensitive control panel.

Provision is preferably made for the information depth of the contents of a menu to be displayed on the display panel to be adjusted by means of the operating element or another operating unit.

In the case of complex operating content, provision can therefore be made for the variety of displays to be split into a function menu, which can be called up by the press of a button, in which, for example, basic operating modes and programs of the household appliance and the like can be displayed, and an option menu in which additional selectable options such as, for example, rapid heating-up in the case of an oven and the like, can be enhanced.

Provision can also be made for the user to customize the menu interface and/or the menu contents by actuating the operating element and then in particular also storing the user-specific embodiment. Provision can also be made in this case for individual contents to be combined or regrouped.

Provision is preferably made, separately from the operating element, for there to be least one operating device which enables the switching on and off of the household appliance. Provision can be made for this operating device to be a touch-sensitive operating panel. This touch-sensitive operating panel can be disposed in the electronic display panel. In an alternate embodiment, however, it can also be embodied outside the dimensions of this electronic display panel.

Preferably, contents to be displayed are displayed as the display contents in virtually digital form on the electronic display panel around a moveable operating element which is, in particular, centrally positioned in the display panel and relative to the display panel with regard to the setting of the operating conditions of the household appliance. In particular, when the operating element is rotated, the displayed values and/or information are identified in relation to the selection. In particular, the set value is accepted by confirmation or a predefinable waiting time following the selection or the change to another function.

Due to the at least one further operating unit, context-related, required functions or contents can be assigned thereto and as a result the necessary number of additional operating units is kept as low as possible.

The main advantages of the operating device are that, due to the combination of virtually one manually operated operating element and an electronic display unit, complex menu depths can be displayed in a very simple and clear form and, due to the positional arrangement of the aforesaid two components, very user-friendly operation and very dependable and reliable legibility of the information can be obtained. At the same time, the very compact embodiment of the operating device should not be overlooked.

Because of the simultaneous display of a great many setting values, the fascia display offers the best possible overview when setting parameter values in relation to the usable display height, and is therefore superior to a list display in the conventional sense.

At any one time, the context-related display of options allows only the necessary selection options to be displayed and therefore enables the visual complexity of the user interface to be minimized. The same also applies to the clear separation into function menu contents and options menu contents, which focuses on standard operations or subsequent additional options.

Moreover, the invention also relates to a household appliance having an operating device or an advantageous embodiment thereof. The household appliance is, in particular, embodied for food preparation and can be a hob or an oven, for example.

Further features of the invention are disclosed in the claims, the figures and the description of the figures. The prominent features and combinations of features cited in the description, as well as the features and combinations of features shown only in the figures alone and/or the features and combinations of features cited in the description of the figures, are applicable not only in the relevant stated combination, but also in other combinations or in isolation, without departing from the scope of the invention.

BRIEF DESCRIPTION OF THE DRAWINGS

Exemplary embodiments of the invention are explained in further detail below with reference to schematic drawings, of which:

FIG. 1 shows a perspective representation of an exemplary embodiment of an inventive household appliance;

FIG. 2 shows a front view of a first exemplary embodiment of an operating device;

FIG. 3 shows a front view of a second exemplary embodiment of an inventive operating device;

FIG. 4 shows a front view of a third exemplary embodiment of an inventive operating device, and FIG. 5 shows a front view of a fourth exemplary embodiment of an inventive operating device.

DETAILED DESCRIPTION OF EXEMPLARY EMBODIMENTS OF THE PRESENT INVENTION

In the figures, identical elements or those with identical functions have identical reference characters.

FIG. 1 shows a simplified schematic representation of a household appliance embodied as an oven 1. The oven 1 contains four cooking zones 2, 3, 4 and 5 and a cooking compartment 6 which is closeable by a door 7 which has a handle 8 on the outside. In the exemplary embodiment, an operating panel 9 having an operating device 10 is arranged above the door 7. Both the position and the embodiment of the operating panel 9 is merely exemplary.

FIG. 2 shows a simplified representation of a front view of an exemplary embodiment of the operating device 10. The operating device 10 contains an electronic display panel 11 embodied as a display. Information can be displayed in a dynamically changing form on the display panel 11, which in terms of area is limited by the edge or the boundary 12, and which in the exemplary embodiment is rectangular. Different information in the form of letters and/or numbers and/or symbols can be displayed on a screen of this type.

In addition, the operating device 10 contains an operating element 13 which in the exemplary embodiment is a rotary selector switch. As can be seen in the representation in FIG. 2, viewed from the front, the rotary selector switch 13 is arranged so that its surface dimensions, projected into the plane of the figure, are completely within the area 12a with the boundary 12 of the electronic display panel 11. It is therefore positioned so as to be virtually completely embedded in the surface dimensions of the display panel 11. Due to its embodiment as a rotary selector switch the operating element 13 is able to move relative to the display panel 11. The operating conditions of the oven 1 are set by the associated rotation of the operating element 13. As can be seen, an information display in the form of symbols 14 in FIG. 2 is realized adjacent to and at least in circular sections around the annular operating element 13. The number of symbols 14 is merely exemplary. Provision can also be made for numbers and/or letters to be displayed instead of symbols 14. In an alternate embodiment, the information around the annular operating element 13 also represents menu interfaces 19 (FIGS. 3 to 5) which then define a specific folder structure. The information then displayed can represent a term for a folder which then contains further information. If such a folder is then selected by rotating the operating element 13, the menu content can be shown again in more detail.

As can be seen in the exemplary embodiment in FIG. 2, two operating units 16a and 16b are embodied outside the area with the boundary 12 of the display panel 11. In the exemplary embodiment, these operating units 16a and 16b are embodied as touch-sensitive operating panels. On the one hand they can fulfill the function of switching the oven 1 on and off, for example. Additionally or instead of this, provision can also be made for at least one of the operating units 16a or 16b to be embodied for setting an information depth of a menu content to be displayed on the display panel 11. This means that the information as shown in FIG. 2 as symbols 14 or as menu headings of a menu interface 19, can be changed by one of the operating units 16a or 16b. If necessary, a setting can be implemented whereby a term to be displayed for a folder is not that of the higher-level main folder but represents a lower folder structure and a subfolder is displayed as the basic setting, for example.

Provision can also be made for the operating unit 16a and/or 16b to be positioned within the area with the boundary 12 of the display panel 11.

FIG. 3 shows in a simplified schematic representation a front view of the operating device 10 according to a further exemplary embodiment. In contrast to the embodiment in FIG. 2, provision is made here for words or texts 15, which can be head words or also short sentences, for example, to be displayed as information around the annular operating element 13.

FIG. 4 shows in a further schematic representation a front view of a further exemplary embodiment of an operating device 10. In this embodiment, the information display around the operating element 13 is in each case a combination of a symbol 14 and word information or text information 15.

FIG. 5 shows a further exemplary embodiment of a front view of an operating device 10. In this embodiment, provision is made for a circular area 17 enclosed by the ring of the operating element 13 to be embodied as a further panel area for displaying information and/or as a touch-sensitive operating panel. Provision can therefore be made for numbers and/or letters and/or symbols to be displayed as information 18 on this electronic panel area.

Provision can be made in all embodiments for the symbol 14 and/or the words or texts 15 which are specifically dependent on the rotary position of the operating element 13 to be clearly indicated when activated. This can be realized, for example, by illumination or illumination in a luminous color which is different for the non-activated symbols 14 and/or words 15. Additionally, or instead of this, provision can also be made for a symbol 14 and/or a word 15 to be clearly indicated by font size and/or number size as being selected and activated as a function of the selection by the rotary position of the operating element 13.

The invention claimed is:

1. An operating device for a household appliance, comprising:
    an electronic display panel having a panel surface;
    an operating element, movable relative to the display panel for setting operating conditions of the household appliance, the operating element being adjacent the display panel and projecting outwardly from the display panel, wherein the operating element is disposed within surface dimensions of the display panel such that a contour of an edge of the operating element is configured to appear coincident with a contour of a surface edge of the display panel, and
    a front face disposed on the operating element, the front face including a touch-sensitive screen electronic display on which information can be displayed and by which operating conditions can be set.

2. The operating device of claim 1, wherein the operating element comprises a rotary selector switch.

3. The operating device of claim 1, wherein the display panel further comprises an area for display of information which is changeable as a function of an activation of the operating element.

4. The operating device of claim 3, wherein the operating element is activated by a rotational movement of the operating element to change the display of information.

5. The operating device of claim 1, further comprising a menu interface displayed on the display panel around the operating element.

6. The operating device of claim 5, wherein the menu interface is dynamically changeable.

7. The operating device of claim 5, wherein the menu interface comprises menu contents that can be activated as a function of a rotational position of the operating element.

8. The operating device of claim 7, wherein activation of the menu contents is displayed through a member selected from the group consisting of illumination, change in a font size, number size, and symbol size.

9. The operating device of claim 7, wherein activation of one of the menu contents is displayed by a luminous color which differs from a luminous color of a non-activated one of the menu contents.

10. The operating device of claim 1, wherein the operating element is ring shaped.

11. The operating device of claim 1, wherein the operating element encloses an area having a touch-sensitive operating panel with which operating conditions of the household appliance can be set by touch.

12. The operating device of claim 1, wherein the menu interface comprises menu content defined by an information path to be displayed on the display panel, said information path being capable of being set by the operating element or a further operating unit.

13. The operating device of claim 1, further comprising an operating unit separate from the operating element, said operating unit switching on or off the household appliance or interrupting a current program of the household appliance.

14. The operating device of claim 13, wherein the operating unit comprises a touch-sensitive operating panel.

15. The operating device of claim 13, wherein the operating unit is in the display panel.

16. The operating device of claim 13, wherein the operating unit is outside the display panel.

17. A household appliance, comprising:
an electronic display panel having a panel surface; and
an operating element, movable relative to the display panel for setting operating conditions of the household appliance, the operating element being adjacent the display panel and projecting outwardly from the display panel, wherein the operating element is disposed within surface dimensions of the display panel such that a contour of an edge of the operating element is configured to appear coincident with a contour of a surface edge of the display panel, and
a front face of disposed on the operating element, the front face including a touch-sensitive screen electronic display on which information can be displayed and by which operating conditions can be set.

18. The household appliance of claim 17, wherein the operating element comprises a rotary selector switch.

19. The household appliance of claim 17, wherein the display panel has an area for display of information which is changeable as a function of an activation of the operating element.

20. The household appliance of claim 19, wherein the operating element is activated by a rotational movement of the operating element to change the display of information.

21. The household appliance of claim 17, wherein the operating device includes a menu interface displayable on the display panel around the operating element.

22. The household appliance of claim 21, wherein the menu interface is dynamically changeable.

23. The household appliance of claim 21, wherein the menu interface has menu contents that can be activated as a function of a rotational position of the operating element.

24. The household appliance of claim 23, wherein activation of the menu contents is displayed through a member selected from a group consisting of illumination, change in a font size, number size, and symbol size.

25. The household appliance of claim 23, wherein activation of one of the menu contents is displayed by a luminous color which differs from a luminous color of a non-activated one of the menu contents.

26. The household appliance of claim 17, wherein the operating element is ring shaped.

27. The household appliance of claim 17, wherein the operating element encloses an area having a touch-sensitive operating panel with which operating conditions of the household appliance can be set by touch.

28. The household appliance of claim 17, wherein the menu interface comprises a menu content defined by an information path displayed on the display panel, said information path being capable of being set by the operating element or a further operating unit.

29. The household appliance of claim 17, wherein the operating device includes an operating unit that is separate from the operating element, said operating unit switching on or off the household appliance or interrupting a current program of the household appliance.

30. The household appliance of claim 29, wherein the operating unit comprises a touch-sensitive operating panel.

31. The household appliance of claim 29, wherein the operating unit is in the display panel.

32. The household appliance of claim 29, wherein the operating unit is outside the display panel.

* * * * *